(12) United States Patent
Pandit et al.

(10) Patent No.: US 8,532,175 B2
(45) Date of Patent: Sep. 10, 2013

(54) METHODS AND APPARATUS FOR REDUCING CODING ARTIFACTS FOR ILLUMINATION COMPENSATION AND/OR COLOR COMPENSATION IN MULTI-VIEW CODED VIDEO

(75) Inventors: Purvin Bibhas Pandit, Franklin Park, NJ (US); Peng Yin, West Windsor, NJ (US); Yeping Su, Camas, WA (US)

(73) Assignee: Thomson Licensing, Boulogne-Billancourt (FR)

( * ) Notice: Subject to any disclaimer, the term of this patent is extended or adjusted under 35 U.S.C. 154(b) by 698 days.

(21) Appl. No.: 12/448,460

(22) PCT Filed: Jan. 4, 2008

(86) PCT No.: PCT/US2008/000083
§ 371 (c)(1),
(2), (4) Date: Feb. 9, 2010

(87) PCT Pub. No.: WO2008/085865
PCT Pub. Date: Jul. 17, 2008

(65) Prior Publication Data
US 2010/0183068 A1 Jul. 22, 2010

Related U.S. Application Data

(60) Provisional application No. 60/883,466, filed on Jan. 4, 2007.

(51) Int. Cl.
*H04N 7/12* (2006.01)
*H04N 11/02* (2006.01)
*H04N 11/04* (2006.01)

(52) U.S. Cl.
USPC ............ 375/240.02; 375/240.12; 375/240.13; 375/240.14; 375/240.29; 348/394.1; 348/396.1; 348/404.1; 348/412.1; 348/415.1; 382/239; 382/260; 382/261

(58) Field of Classification Search
USPC ................... 375/240-241; 348/384.1-440.1; 382/239, 260, 261
See application file for complete search history.

(56) References Cited

U.S. PATENT DOCUMENTS 7,831,102 B2* 11/2010 Yang .............................. 382/233
7,869,523 B2* 1/2011 Joch et al. ................ 375/240.29

(Continued)

FOREIGN PATENT DOCUMENTS

| EP | 1408697 | 4/2004 |
| JP | 2008-154221 | 7/2008 |

OTHER PUBLICATIONS

Yo-Sung Ho; Kwan-Jung Oh, "Overview of Multi-view Video Coding," IEEE, 2007.*

(Continued)

*Primary Examiner* — Sath V Perungavoor
*Assistant Examiner* — Nathnael Aynalem
(74) *Attorney, Agent, or Firm* — Robert D. Shedd; Guy H. Eriksen (57) ABSTRACT

There are provided methods and apparatus for reducing coding artifacts for illumination compensation and/or color compensation in multi-view coded video. An apparatus includes an encoder for encoding at least one block in at least one picture for at least one view of multi-view video content. The encoder has a deblocking filter for performing adaptive deblocking filtering on the at least one block responsive to an indication of at least one of illumination compensation and color compensation being used for the at least one block.

25 Claims, 7 Drawing Sheets

(56) References Cited

U.S. PATENT DOCUMENTS

| | | | | |
|---|---|---|---|---|
| 8,345,777 | B2* | 1/2013 | Lee et al. | 375/240.29 |
| 2004/0184549 | A1* | 9/2004 | Webb | 375/240.29 |
| 2005/0013363 | A1* | 1/2005 | Cho et al. | 375/240.12 |
| 2008/0144722 | A1 | 6/2008 | Park et al. | |

OTHER PUBLICATIONS

Dorse, Michael et al. "Extending Single-View Scalable Video Coding to Multi-View Based on H.264/AVC," IEEE, 2006.*

ISO: "Description of Core Experiments in Multiview Video Coding," Video Standards and Drafts, No. W8019, Apr. 7, 2006, pp. 1-38, XP030014511.

Anantrasirichai et al.: "Multi-View Image Coding with Wavelet Lifting and In-Band Disparity Compensation," Image Processing, ICIP 2005, IEEE International Conference in Genova, Italy, Sep. 11, 2005, XP010851389.

Chen et al.: "A Memory Efficient Architecture for Deblocking Filter in H.264 Using Vertical Processing Order," Proceedings of the 2005 International Conference in Melbourne on Intelligent Sensors, Sensor Networks and Information Processing Dec. 5, 2005, IEEE, pp. 361-366, XP010894796.

Su et al.: "Deblocking Filter Adaptation for MVC," Contirubtion to the 76th MPEG meeting. Video Standards and Drafts, No. M13320, Mar. 30, 2006, XP030041989.

Ohm et al.: "Incomplete 3-D Multiview Representation of Video Objects," IEEE Transactions on Circuits and Systems for Video Technology, IEEE Service Center, Piscataway, NJ, USA. vol. 9, No. 2, Mar. 1, 1999, XP011014558.

Park et al.: "MVC Deblocking for Illumination Compensation," Video Standards and Drafts, JVT-V033, Jan. 10, 2007, pp. 1-22, XP030006841.

Shim et al.: "Deblocking Filter on Illumination Compensation," Video Standards and Drafts, JVT-V051, Jan. 10, 2007, pp. 1-9, XP030006859.

Vetro et al.: "Joint Draft 1.0 on Multiview Video Coding," Video Standards and Drafts, JVT-U209, Oct. 20, 2006, pp. 1-20.

Lee et al.: "CE11: Illumination Compensation," Video Standards and Drafts, No. JVT-U052, Oct. 20, 2006, pp. 1-16, XP030006698.

International Search Report, dated Aug. 4, 2008.

* cited by examiner

METHODS AND APPARATUS FOR REDUCING CODING ARTIFACTS FOR ILLUMINATION COMPENSATION AND/OR COLOR COMPENSATION IN MULTI-VIEW CODED VIDEO

CROSS-REFERENCE TO RELATED APPLICATIONS

This application claims the benefit, under 35 U.S.C. §365 of International Application PCT/US2008/000083, filed Jan. 4, 2008 which was published in accordance with PCT Article 21(2) on Jul. 17, 2008 in English and which claims the benefit of U.S. provisional patent application No. 60/883,466 filed Jan. 4, 2007.

TECHNICAL FIELD

The present principles relate generally to video decoding and, more particularly, to methods and apparatus for reducing coding artifacts for illumination compensation and/or color compensation in multi-view coded video.

BACKGROUND

In a practical scenario, multi-view video systems involving a large number of cameras might be built using heterogeneous cameras, or cameras that have not been perfectly calibrated. This leads to differences in luminance and chrominance when the same parts of a scene are viewed with different cameras. Moreover, camera distance and positioning also affects illumination, in the sense that the same surface may reflect the light differently when perceived from different angles. Under these scenarios, luminance and chrominance differences will decrease the efficiency of cross-view prediction.

Illumination compensation (IC) is a coding technique to compensate for illumination/color differences in coding multi-view materials. Compared to the International Organization for Standardization/International Electrotechnical Commission (ISO/IEC) Moving Picture Experts Group-4 (MPEG-4) Part 10 Advanced Video Coding (AVC) standard/ International Telecommunication Union, Telecommunication Sector (ITU-T) H.264 recommendation (hereinafter the "MPEG-4 AVC standard"), illumination compensation employs predictive coding for the direct current (DC) component of Inter prediction residues. The predictor for illumination change is formed from neighboring blocks to explore the strong spatial correlation of illumination differences.

The local ICA (Illumination change-adaptive) MC (motion compensation) method aims to compensate local illumination changes between pictures in multi-view sequences.

Illumination change-adaptive motion compensation is enabled for the following macroblock modes in the multi-view video coding extension of the MPEG-4 AVC Standard: Inter 16×16 mode; Direct 16×16 mode (including B_Skip); and P_Skip mode.

If mb_ic_flag is equal to zero for the current macroblock (MB), then illumination change-adaptive motion compensation is not performed, i.e., the conventional decoding process is performed. Otherwise, the differential pulse code modulation (DPCM) value of the differential value of illumination compensation (DVIC), namely dpcm_of_dvic, is used, and the proposed illumination change-adaptive motion compensation is performed as follows:

$$DVIC = dpcm\_of\_dvic + pred_{DVIC}$$

$$f'(i,j) = \{MR\_R''(x',y',i,j) + r(i+x',j+y')\} + DVIC$$

where f'(i,j) represents the reconstructed partition before deblocking filtering, r(i,j) represents the reference frame, and MR_R"(i,j) represents the reconstructed residual signal. The predictor $pred_{DVIC}$ is obtained from the neighboring blocks by using the prediction process which is defined in the MPEG-4 AVC Standard. When illumination compensation is used in bi-predictive coding, there is only one dpcm_of_dvic signaled, and the reconstructed differential value of illumination compensation value is added to the prediction signal. This is equivalent to using two identical values for the differential value of illumination compensation for forward and backward prediction signals.

For illumination change-adaptive motion compensation, illumination compensation can be used for both Skip and Direct modes.

For P skip mode, both mb_ic_flag and dpcm_of_dvic are derived from neighboring Macroblocks. The syntax mb_ic_flag is set to one if illumination compensation is enabled for either the upper macroblock or the left macroblock. The average value of the differential value of illumination compensation from the upper and left macroblocks is used as an illumination compensation parameter of the current macroblock if both neighboring macroblocks use illumination compensation. If only one neighboring macroblock uses illumination compensation, the differential value of illumination compensation of that macroblock is used for the current macroblock.

For Direct_16×16 and B_Skip mode for B_SLICE, both mb_ic flag and dpcm_of_dvic are present in the bitstream.

The prediction process of differential value of illumination compensation will now be described.

Figure 3:
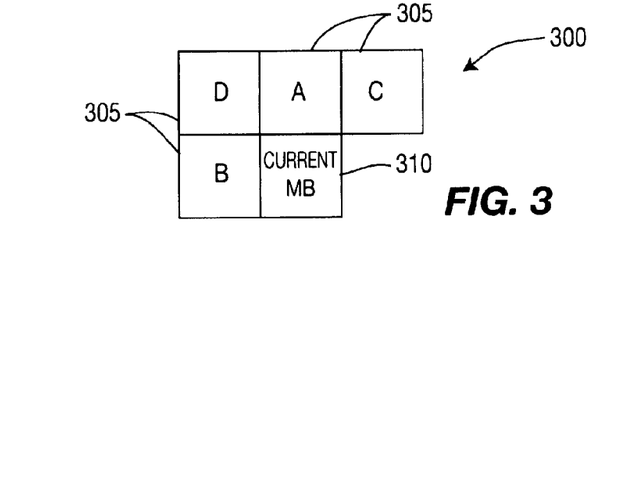
FIG. 3 is a diagram for an exemplary layout of block showing the neighboring blocks used for the prediction of the current differential value of illumination compensation (DVIC) to which the present principles may be applied, in accordance with an embodiment of the present principles.

Differential value of illumination compensation refers to the local illumination change in each macroblock. The differential pulse code modulation of differential value of illumination compensation, namely dpcm_of_dvic, is written to the bitstream using the predictor ($pred_{DVIC}$) obtained from the differential value of illumination compensation of the neighboring macroblocks as shown in FIG. 3. Turning to FIG. 3, an exemplary layout of block showing the neighboring blocks used for the prediction of the current differential value of illumination compensation (DVIC) is indicated generally by the reference numeral 300. In FIG. 3, the current macroblock to be encoded is indicated by the reference numeral 310, and the neighboring macroblocks used to predict the current macroblock 310 are indicated by the reference numeral 305.

The $pred_{DVIC}$ is obtained by performing the following steps:

(1) If the above macroblock "A" of the current macroblock was encoded using macroblock-based illumination change-adaptive motion compensation and its reference index is equal to a reference index of the current macroblock, then $pred_{DVIC}$ is set to the differential value of illumination compensation of macroblock "A" and the process is finalized. Otherwise, go to next step.

(2) If the left macroblock "B" of the current macroblock was encoded using macroblock-based illumination change-adaptive motion compensation and its reference index is equal to a reference index of the current macroblock, then $pred_{DVIC}$ is set to the differential value of illumination compensation of macroblock "B" and the process is finalized. Otherwise, go to the next step.

(3) If the right-above macroblock "C" of the current macroblock was encoded using macroblock-based illumination change-adaptive motion compensation and its reference index is equal to a reference index of the current macroblock, then pred$_{DVIC}$ is set to the differential value of illumination compensation of macroblock "C" and the process is finalized. Otherwise, go to the next step.

(4) If the left-above macroblock "D" of the current macroblock was encoded using macroblock-based illumination change-adaptive motion compensation and its reference index is equal to a reference index of the current macroblock, then pred$_{DVIC}$ is set to the differential value of illumination compensation of macroblock "D" and the process is finalized. Otherwise, go to the next step.

(5) If the neighboring macroblocks "A", "B", and "C" were encoded using macroblock-based illumination change-adaptive motion compensation, then these three DVICs are median-filtered. pred$_{DVIC}$ is set to the result of median-filtering and the process is finalized. Otherwise, go to the next step.

(6) pred$_{DVIC}$ is set to zero and the process is finalized.

By using this process, the number of bits for differential value of illumination compensation can be reduced, and then the differential pulse code modulation value of the current differential value of illumination compensation is encoded by the entropy coder. This process shall be performed to reconstruct the differential value of illumination compensation at the decoder.

Since illumination compensation is done on a macroblock basis and only on 16×16 macroblocks, it is observed that it introduces several block artifacts.

The conventional approaches to mitigate coding artifacts were not designed for the specific type of artifact caused by illumination compensation and, thus, cannot fully suppress such artifacts. Since illumination compensation is a coding tool newly introduced in multi-view video coding, no solution have yet been proposed specifically addressing coding artifacts caused by illumination compensation.

SUMMARY

These and other drawbacks and disadvantages of the prior art are addressed by the present principles, which are directed to methods and apparatus for reducing coding artifacts for illumination compensation and/or color compensation in multi-view coded video.

According to an aspect of the present principles, there is provided an apparatus. The apparatus includes an encoder for encoding at least one block in at least one picture for at least one view of multi-view video content. The encoder has a deblocking filter for performing adaptive deblocking filtering on the at least one block responsive to an indication of at least one of illumination compensation and color compensation being used for the at least one block.

According to another aspect of the present principles, there is provided a method. The method includes encoding at least one block in at least one picture for at least one view of multi-view video content. The encoding step includes performing adaptive deblocking filtering on the at least one block responsive to an indication of at least one of illumination compensation and color compensation being used for the at least one block.

According to yet another aspect of the present principles, there is provided an apparatus. The apparatus includes a decoder for decoding at least one block in at least one picture for at least one view of multi-view video content. The decoder has a deblocking filter for performing adaptive deblocking filtering on the at least one block responsive to an indication of at least one of illumination compensation and color compensation being used for the at least one block.

According to still another aspect of the present principles, there is provided a method. The method includes the step of decoding at least one block in at least one picture for at least one view of multi-view video content. The decoding step includes performing adaptive deblocking filtering on the at least one block responsive to an indication of at least one of illumination compensation and color compensation being used for the at least one block.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus for reducing coding artifacts for illumination compensation and/or color compensation in multi-view coded video.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

It is to be appreciated that the use of the term "and/or", for example, in the case of "A and/or B", is intended to encompass the selection of the first listed option (A), the selection of the second listed option (B), or the selection of both options (A and B). As a further example, in the case of "A, B, and/or C", such phrasing is intended to encompass the selection of the first listed option (A), the selection of the second listed option (B), the selection of the third listed option (C), the selection of the first and the second listed options (A and B), the selection of the first and third listed options (A and C), the selection of the second and third listed options (B and C), or the selection of all three options (A and B and C). This may be extended, as readily apparent by one of ordinary skill in this and related arts, for as many items listed.

It is to be further appreciated that while one or more embodiments of the present principles are described herein with respect to the multi-view video coding extension of the MPEG-4 AVC standard, the present principles are not limited to solely this standard and extension thereof and, thus, may be utilized with respect to other video coding standards, recommendations, and extensions thereof, that implement multi-view video coding, while maintaining the spirit of the present principles.

Moreover, it is to be appreciated that the alpha table index is used to index the alpha table in the MPEG-4 AVC decoding process. The alpha table is used in the filtering of edges with a boundary strength Bs less than 4.

Figure 1:
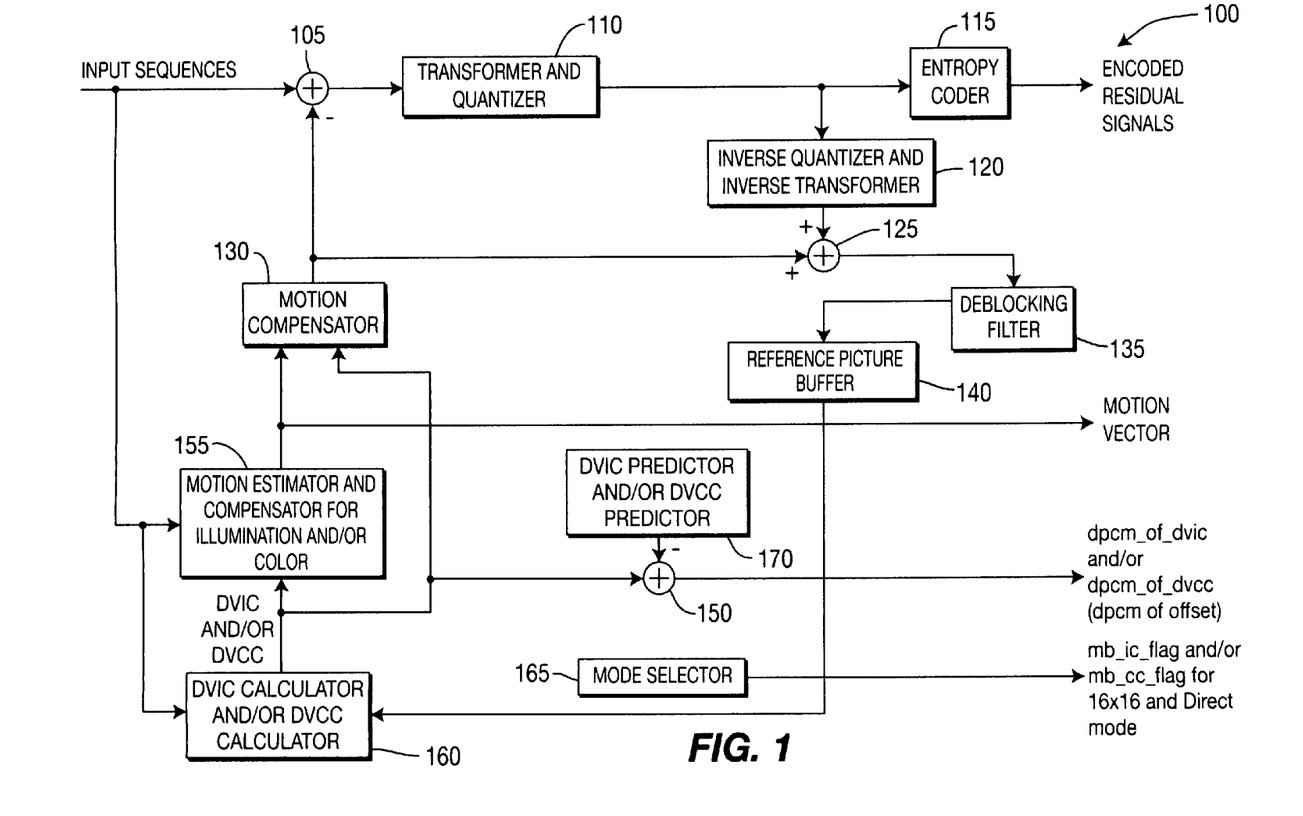
FIG. 1 is a block diagram for an exemplary video encoder having reduced coding artifacts for illumination compensation and/or color compensation to which the present principles may be applied, in accordance with an embodiment of the present principles.

Turning to FIG. 1, an exemplary video encoder having reduced coding artifacts for illumination compensation and/or color compensation is indicated generally by the reference numeral 100.

The encoder 100 includes a combiner 105 having an output in signal communication with an input of a transformer and quantizer 110. An output of the transformer and quantizer 110 is connected in signal communication with an input of an entropy coder 115 and an input of an inverse quantizer and inverse transformer 120. An output of the inverse quantizer and inverse transformer 120 is connected in signal communication with first non-inverting input of a combiner 125. An output of the combiner 125 is connected in signal communication with an input of a deblocking filter 135 (for deblocking a reconstructed picture). An output of the deblocking filter 135 is connected in signal communication with an input of a reference picture buffer 140. An output of the reference picture buffer 140 is connected in signal communication with a first input of a differential value of illumination compensation (DVIC) calculator and/or differential value of color compensation (DVCC) calculator 160. An output of the DVIC calculator and/or DVCC calculator 160 is connected in signal communication with an input of motion estimator and compensator for illumination and/or color 155, with a first input of a motion compensator 130, and with a non-inverting input of a combiner 150. An output of the motion estimator and compensator for illumination and/or color 155 is connected in signal communication with a second input of the motion compensator 130. An output of the motion compensator 130 is connected in signal communication with a second non-inverting input of the combiner 125 and a non-inverting input of the combiner 105.

An output of a DVIC predictor and/or DVCC predictor 170 is connected in signal communication with an inverting input of the combiner 150.

A non-inverting input of the combiner 105, a second input of the motion estimator and compensator for illumination and/or color 155, and a second input of the DVIC calculator and/or DVCC calculator 160 are available as inputs to the encoder 100, for receiving input video sequences.

An output of the entropy coder 115 is available as an output of the encoder 100, for outputting encoded residual signals.

The output of the motion estimator and compensator for illumination and/or color 155 is available as an output of the encoder 100, for outputting a motion vector(s).

An output of the combiner 150 is available as an output of the encoder 100, for outputting dpcm_of_dvic and/or dpcm_of_dvcc (dpcm of offset).

An output of a mode selector 165 is available as an output of the encoder 100, for outputting mb_ic_flag and/or mb_cc_flag for 16×16 and direct mode.

The output of the motion compensator 130 provides a motion compensated prediction.

Figure 2:
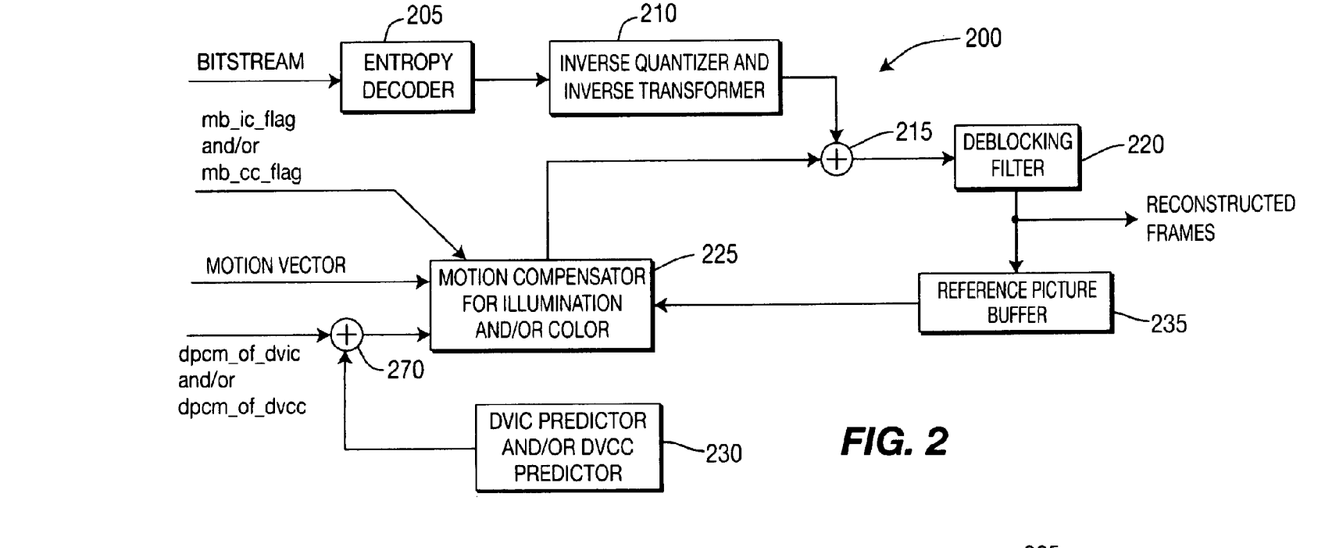
FIG. 2 is a block diagram for an exemplary video decoder having reduced coding artifacts for illumination compensation and/or color compensation to which the present principles may be applied, in accordance with an embodiment of the present principles.

Turning to FIG. 2, an exemplary video decoder having reduced coding artifacts for illumination compensation and/or color compensation is indicated generally by the reference numeral 200.

The decoder 200 includes an entropy decoder 205 having an output connected in signal communication with an input of an inverse quantizer and inverse transformer 210. An output of the inverse quantizer and inverse transformer 210 is connected in signal communication with a first non-inverting input of a combiner 215. An output of the combiner 215 is connected in signal communication with an input of a deblocking filter 220. An output of the deblocking filter 220 is connected in signal communication with an input of a reference picture buffer 235. An output of the reference picture buffer 235 is connected in signal communication with a first input of a motion compensator for illumination and/or color 225. An output of the motion compensator for illumination and/or color 225 is connected in signal communication with a second non-inverting input of a combiner 215.

An output of a differential value of illumination compensation (DVIC) predictor and/or differential value of color compensation (DVCC) predictor 230 is connected in signal communication with a first non-inverting input of a combiner 270.

An input of the entropy decoder 205 is available as an input of the decoder 200, for receiving an input video bitstream.

A second input of the motion compensator for illumination and/or color 225 is available as an input of the decoder 200, for receiving a motion vector(s).

A third input of the motion compensator for illumination and/or color 225 is available as an input of the decoder 200, for receiving mb_ic_flag and/or mb_cc_flag.

A second non-inverting input of the combiner 270 is available as an input of the decoder 200, for receiving dpcm_of_dvic and/or dpcm_of_dvcc.

As noted above, the present principles are directed to methods and apparatus for reducing coding artifacts for illumination compensation and/or color compensation in multi-view coded video. Embodiments of the present principles reduce the coding artifacts for illumination compensation and/or color compensation using modified deblocking filtering.

Deblocking filter is a proven tool to suppress visually unpleasant blocking artifacts. It has also been proven that deblocking filters can increase coding efficiency if used in the prediction loop, for example, as used in the MPEG-4 AVC Standard. The deblocking filter smoothes over the reconstructed pixels near the block boundaries. An effective deblocking filter will need to adjust the filtering strength according to the nature of the signal and the values of certain coding parameters.

In accordance with an embodiment of the present principles, we propose to introduce illumination compensation information and/or color compensation information into the design of a deblocking filter for multi-view video coding (MVC). Such information could be used to vary the strength of the deblocking filter, to vary the length of the deblocking filter, and/or to select a different type of filter, and so forth. That is, it is to be appreciated that the present principles are not limited to adaptation of the preceding parameters of a deblocking filter and, given the teachings of the present principles provided herein, one of ordinary skill in this and related arts will contemplate these and various other deblocking filtering parameters that may be adapted in accordance with the present principles, while maintaining the spirit of the present principles. The goal in all cases is to increase the decoded picture quality by reducing the artifacts around block boundaries caused by using illumination compensation and/or color compensation.

It is to be appreciated that the deblocking technique applied to the predicted pictures as described herein with respect to an embodiment is not restricted to any particular deblocking process and, thus, any deblocking process may be used in the embodiments of the present principles, while maintaining the spirit of the present principles. Thus, for example, while one or more illustrative embodiments are described herein with respect to the deblocking filtering as described in the MPEG-4 AVC Standard, given the teachings of the present principles provided herein, one of ordinary skill in this and related arts will readily be able to implement other deblocking approaches in accordance with, and maintaining the spirit of, the present principles.

Figure 4:
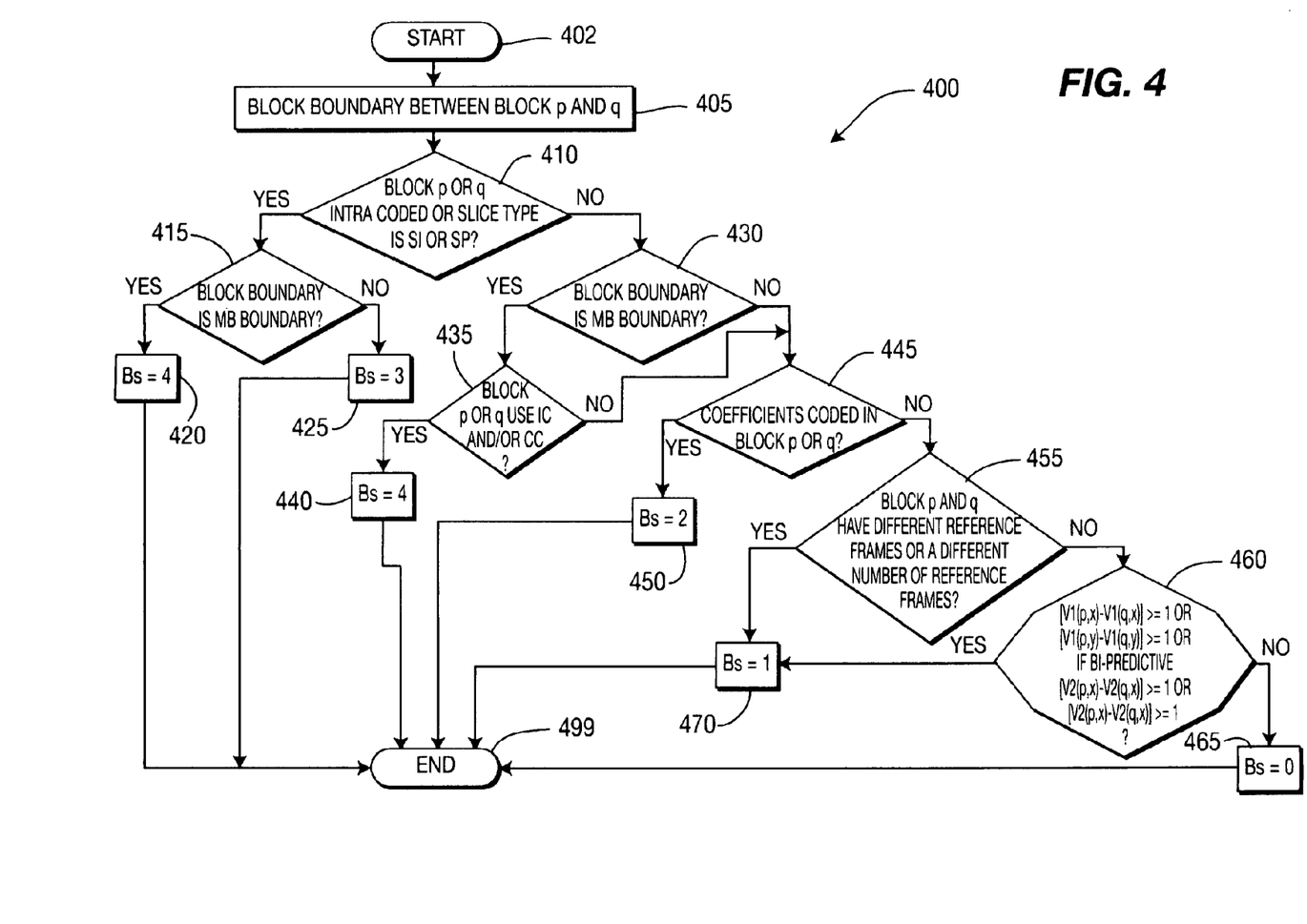
FIG. 4 is a flow diagram for an exemplary method for setting the boundary strength for a deblocking filter to reduce artifacts resulting from illumination compensation and/or color compensation, in accordance with an embodiment of the present principles.
Figure 5:
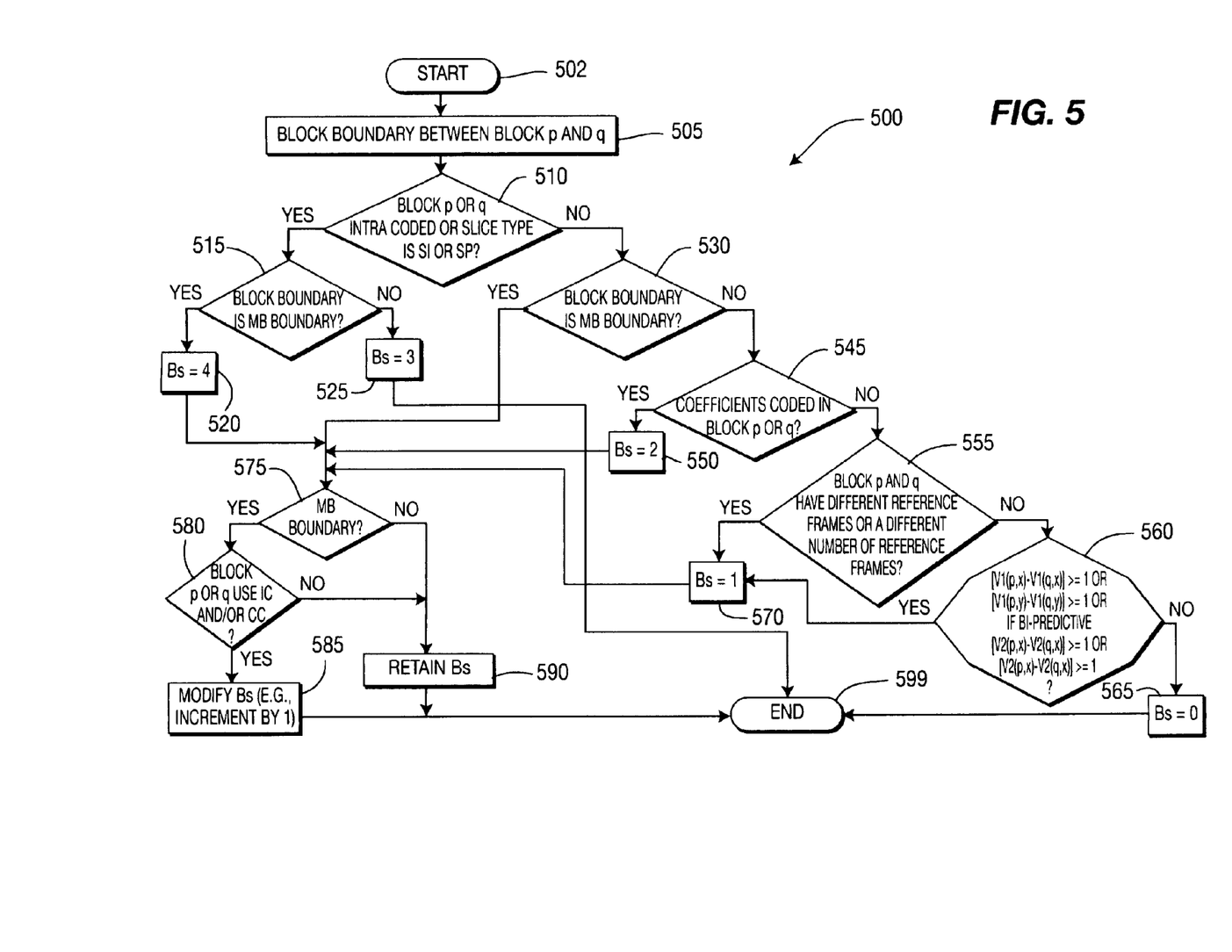
FIG. 5 is a flow diagram for another exemplary method for setting the boundary strength for a deblocking filter to reduce artifacts resulting from illumination compensation and/or color compensation, in accordance with an embodiment of the present principles.
Figure 6:
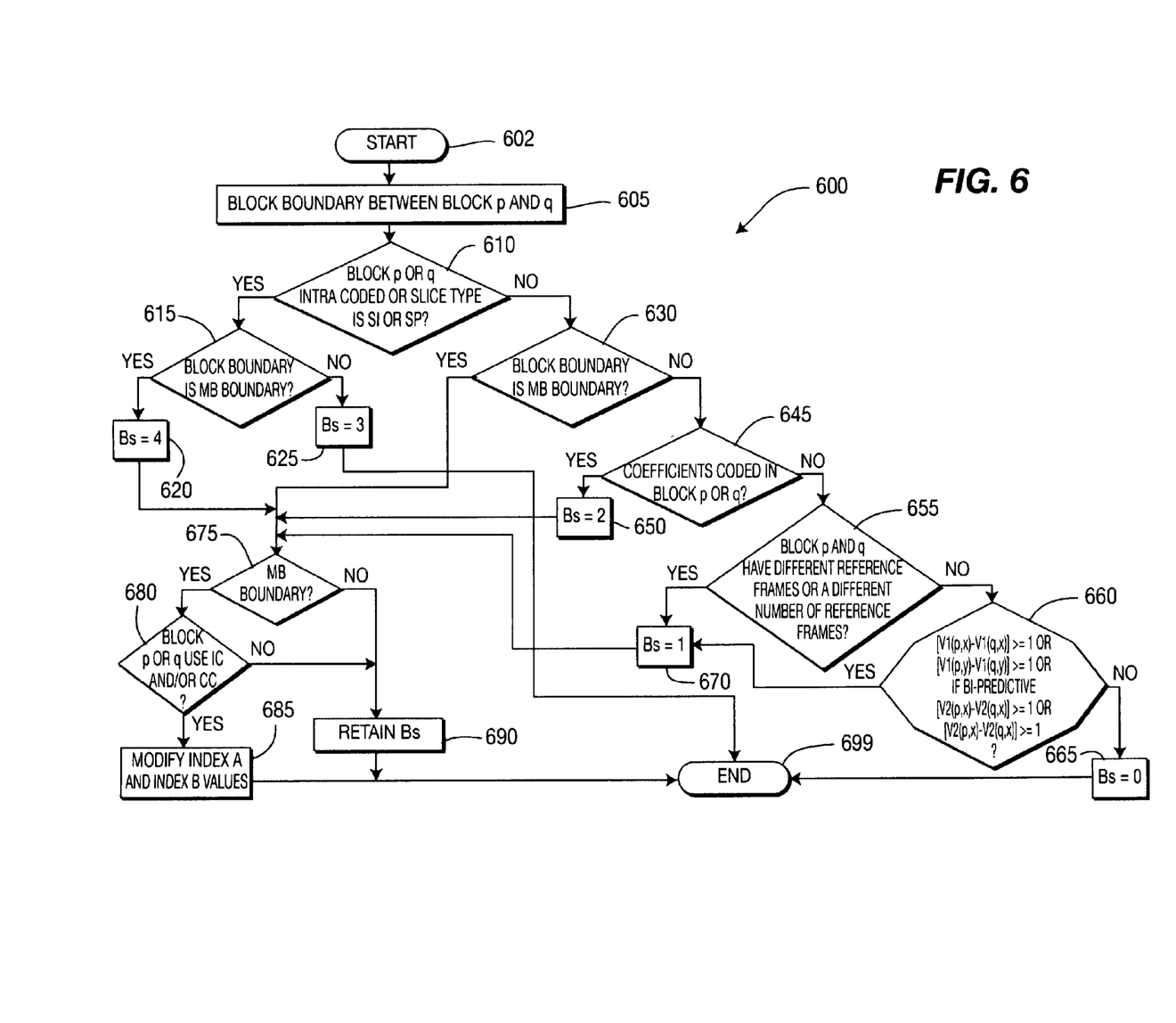
FIG. 6 is a flow diagram for an exemplary method for setting the boundary strength for a deblocking filter to reduce artifacts resulting from illumination compensation and/or color compensation, in accordance with an embodiment of the present principles.

The deblocking filter described in the MPEG-4 AVC Standard applies to all edges between 4×4 blocks. Furthermore, for each edge, the deblocking filter has the capability to adapt its strength. The parameter that controls the filter strength is referred as boundary strength (Bs), as illustrated in FIGS. 4-6. The value of the boundary strength indicates the likeliness of having visual blockiness on each edge and, hence, the need for a more or less softening filters. Higher values of the boundary strength Bs indicate that a stronger deblocking filtering will be applied.

In accordance with an embodiment of the present principles, the boundary strength computation should also take into account the new illumination compensation coding tool in case of encoding multi-view sequences. In FIGS. 4-6, a possible boundary strength estimation algorithm is shown, where the strength is adjusted according to one or more of the following coding parameters: illumination compensation mode; edge position; block type; number of coded coefficients; reference frame index; and motion/disparity vector differences. In general, the inter-predicted blocks using illumination compensation and/or color compensation will cause more blockiness if the two neighboring blocks use different illumination compensation offsets and/or color compensation offsets. Thus, assigning higher boundary strength on these edges will provide better filtering results.

Several illustrative conditions are described herein regarding the setting the boundary strength Bs. Of course, the present principles are not limited to solely these conditions and other conditions may also be utilized as readily contemplated by one of ordinary skill in this and related arts, given the teachings of the present principles provided herein.

In one embodiment, we can change the boundary strength Bs based on whether illumination compensation and/or color compensation is used or not in a macroblock. If any one of the neighboring left or top macroblocks or the current macroblock use illumination compensation and/or color compensation, then we set the boundary strength Bs to 4, which is the strongest filter. This condition is checked only for the left and top macroblock boundary edges and not internal edges. The result is that the blocking artifact has been reduced significantly.

In another embodiment, being a variation of the preceding embodiment, the boundary strength is set to 4 for the left macroblock edge only when both the left and the current macroblocks use illumination compensation and/or color compensation and for the top macroblock edge only when both the top and the current macroblocks use illumination compensation and/or color compensation.

One disadvantage of setting the boundary strength Bs to 4 is that it may cause considerable blurriness and reduced coding efficiency. To overcome this, instead of setting the boundary strength Bs to 4, we simply increment the boundary strength Bs that is returned by the Bs function by an offset such as 1 if the conditions of illumination compensation and/or color compensation (similar to above) are met. It is to be appreciated that while the preceding example describes setting the boundary strength Bs to 4, such value is for illustrative purposes and, thus, any value between 1 and 4 may be used, while maintaining the spirit of the present principles.

Turning to FIG. 4, an exemplary method for setting the boundary strength for a deblocking filter to reduce artifacts resulting from illumination compensation and/or color compensation is indicated generally by the reference numeral 400.

The method 400 includes a start block 402 that passes control to a function block 405. The function block 405 determines the block boundary between block p and block q, and passes control to a decision block 410. The decision block 410 determines whether or not block p or block q are intra coded or whether the slice type of each is SI or SP. If so (i.e., if any of block p or block q is intra coded or the slice type of each is SI or SP), then control is passed to a function block 415. Otherwise (i.e., if none of block p or block q is not intra coded or the slice type of each is not SI or SP), control is passed to a decision block 430.

The decision block 415 determines whether or not the block boundary is a macroblock boundary. If so, then control is passed to a function block 420. Otherwise, control is passed to a function block 425.

The function block 420 sets the boundary strength Bs to 4, and passes control to an end block 499.

The function block 425 sets the boundary strength to 3, and passes control to the end block 499.

The decision block 430 determines whether or not the block boundary is a macroblock boundary. If so, then control is passes to a decision block 435. Otherwise, control is passed to a decision block 445.

The decision block 435 determines whether or not block p or block q use illumination compensation and/or color compensation. If so, then control is passed to a function block 440. Otherwise, control is passed to a decision block 445.

The function block 440 sets the boundary strength to 4, and passes control to the end block 499.

The decision block 445 determines whether or not coefficients have been coded in (any of) block p or block q. If so, then control is passed to a function block 450. Otherwise, control is passed to a decision block 455.

The function block 450 sets the boundary strength to 2, and passes control to the end block 499.

The decision block 455 determines whether or not block p and block q have different reference frames or a different number of reference frames. If so, then control is passed to a function block 470. Otherwise, control is passed to a decision block 460.

The function block 470 sets the boundary strength to 1, and passes control to the end block 499.

The decision block 460 determines whether or not $|V1(p,x)-V1(q,x)|>=1$ or $|V1(p,y)-V1(q,y)|>=1$ or, if bi-predictive, $|V2(p,x)-V2(q,x)|>=1$ or $|V2(p,x)-V2(q,x)|>=1$. If so (i.e., if any of the preceding conditions specified in decision block 460 are true), then control is passed to the function block 470.

Otherwise (i.e., if none of the preceding conditions specified in decision block 460 are true), control is passed to a function block 465. The function block 465 sets the boundary strength equal to zero, and passes control to the end block 499.

Turning to FIG. 5, another exemplary method for setting the boundary strength for a deblocking filter to reduce artifacts resulting from illumination compensation and/or color compensation is indicated generally by the reference numeral 500.

The method 500 includes a start block 502 that passes control to a function block 505. The function block 505 determines the block boundary between block p and block q, and passes control to a decision block 510. The decision block 510 determines whether or not block p or block q are intra coded or whether the slice type of each is SI or SP. If so (i.e., if any of block p or block q is intra coded or the slice type of each is SI or SP), then control is passed to a function block 515. Otherwise (i.e., if none of block p or block q is not intra coded or the slice type of each is not SI or SP), control is passed to a decision block 530.

The decision block 515 determines whether or not the block boundary is a macroblock boundary. If so, then control is passed to a function block 520. Otherwise, control is passed to a function block 525.

The function block 520 sets the boundary strength Bs to 4, and passes control to a decision block 575.

The function block 525 sets the boundary strength to 3, and passes control to an end block 599.

The decision block 530 determines whether or not the block boundary is a macroblock boundary. If so, then control is passes to a decision block 575. Otherwise, control is passed to a decision block 545.

The decision block 545 determines whether or not coefficients have been coded in (any of) block p or block q. If so, then control is passed to a function block 550. Otherwise, control is passed to a decision block 555.

The function block 550 sets the boundary strength to 2, and passes control to the decision block 575.

The decision block 555 determines whether or not block p and block q have different reference frames or a different number of reference frames. If so, then control is passed to a function block 570. Otherwise, control is passed to a decision block 560.

The function block 570 sets the boundary strength to 1, and passes control to the decision block 575.

The decision block 560 determines whether or not $|V1(p,x)-V1(q,x)|>=1$ or $|V1(p,y)-V1(q,y)|>=1$ or, if bi-predictive, $|V2(p,x)-V2(q,x)|>=1$ or $|V2(p,x)=V2(q,x)|>=1$. If so (i.e., if any of the preceding conditions specified in decision block 560 are true), then control is passed to the function block 570. Otherwise (i.e., if none of the preceding conditions specified in decision block 560 are true), control is passed to a function block 565. The function block 565 sets the boundary strength equal to zero, and passes control to the end block 599.

The decision block 575 determines whether or not a macroblock boundary is present. If so, then control is passed to a decision block 580. Otherwise, control is passed to a function block 590.

The decision block 580 determines whether or not block p or block q use illumination compensation (IC) and/or color compensation. If so, the control is passed to a function block 585. Otherwise, control is passed to a function block 590.

The function block 585 modifies the boundary strength (e.g., increments the boundary strength by 1), and passes control to the end block 599.

The function block 590 retains the currently set boundary strength, and passes control to the end block 599.

Turning to FIG. 6, still another exemplary method for setting the boundary strength for a deblocking filter to reduce artifacts resulting from illumination compensation and/or color compensation is indicated generally by the reference numeral 600.

The method 600 includes a start block 602 that passes control to a function block 605. The function block 605 determines the block boundary between block p and block q, and passes control to a decision block 610. The decision block 610 determines whether or not block p or block q are intra coded or whether the slice type of each is SI or SP. If so (i.e., if any of block p or block q is intra coded or the slice type of each is SI or SP), then control is passed to a function block 615. Otherwise (i.e., if none of block p or block q is not intra coded or the slice type of each is not SI or SP), control is passed to a decision block 630.

The decision block 615 determines whether or not the block boundary is a macroblock boundary. If so, then control is passed to a function block 620. Otherwise, control is passed to a function block 625.

The function block 620 sets the boundary strength Bs to 4, and passes control to a decision block 675.

The function block 625 sets the boundary strength to 3, and passes control to an end block 699.

The decision block 630 determines whether or not the block boundary is a macroblock boundary. If so, then control is passes to a decision block 675. Otherwise, control is passed to a decision block 645.

The decision block 645 determines whether or not coefficients have been coded in (any of) block p or block q. If so, then control is passed to a function block 650. Otherwise, control is passed to a decision block 655.

The function block 650 sets the boundary strength to 2, and passes control to the decision block 675.

The decision block 655 determines whether or not block p and block q have different reference frames or a different number of reference frames. If so, then control is passed to a function block 670. Otherwise, control is passed to a decision block 660.

The function block 670 sets the boundary strength to 1, and passes control to the decision block 675.

The decision block 660 determines whether or not |V1(p,x)−V1(q,x)|>=1 or |V1(p,y)−V1(q,y)|>=1 or, if bi-predictive, |V2(p,x)−V2(q,x)|>=1 or |V2(p,x)−V2(q,x)|>=1. If so (i.e., if any of the preceding conditions specified in decision block 660 are true), then control is passed to the function block 670. Otherwise (i.e., if none of the preceding conditions specified in decision block 660 are true), control is passed to a function block 665. The function block 665 sets the boundary strength equal to zero, and passes control to the end block 699.

The decision block 675 determines whether or not a macroblock boundary is present. If so, then control is passed to a decision block 680. Otherwise, control is passed to a function block 690.

The decision block 680 determines whether or not block p or block q use illumination compensation (IC) and/or color compensation. If so, the control is passed to a function block 685. Otherwise, control is passed to a function block 690.

The function block 685 modifies index A with index B values, and passes control to the end block 699.

The function block 690 retains the currently set boundary strength, and passes control to the end block 699.

Figure 7:
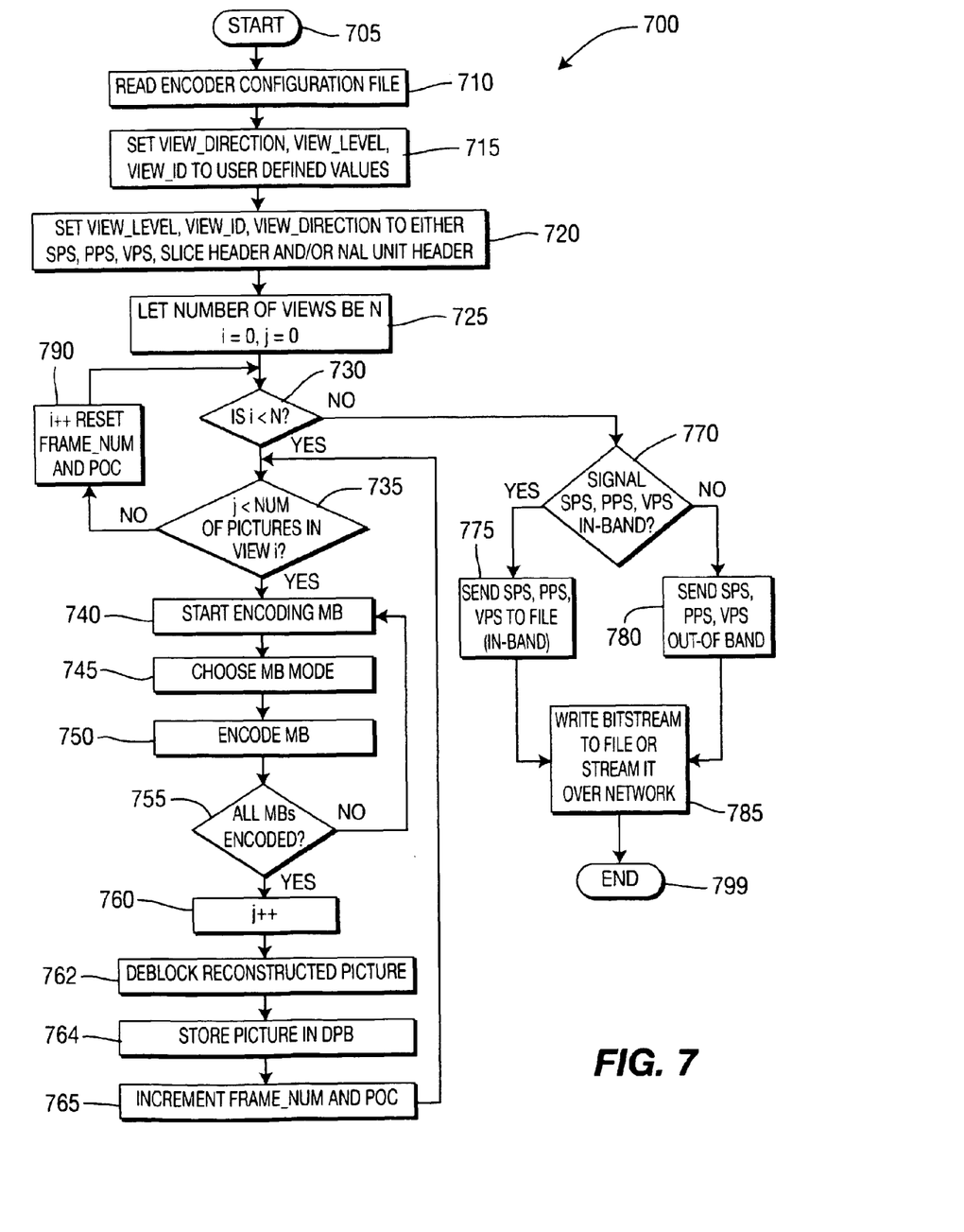
FIG. 7 is a flow diagram for an exemplary method for encoding multi-view video content, in accordance with an embodiment of the present principles.

Turning to FIG. 7, an exemplary method for encoding multi-view video content is indicated generally by the reference numeral 700.

The method 700 includes a start block 700 that passes control to a function block 705. The function block 705 reads an encoder configuration file, and passes control to a function block 715. The function block 715 sets view_direction, view_level, and view_id to user defined values, and passes control to a function block 720. The function block 720 sets the view_level, view_id, and view_direction in the Sequence Parameter Set (SPS), Picture Parameter Set (PPS), View Parameter Set (VPS), slice header, and/or NAL unit header, and passes control to a function block 725. The function block 725 lets the number of views be equal to a variable N, variables i (view number index) and j (picture number index) be equal to zero, and passes control to a decision block 730. The decision block 730 determines whether or not i is less than N. If so, then control is passed to a function block 735. Otherwise, control is passed to a function block 470.

The function block 735 determines whether or not j is less than the number of pictures in view i. If so, then control is passed to a function block 740. Otherwise, control is passed to a function block 790.

The function block 740 starts encoding the current macroblock, and passes control to a function block 745. The function block 745 chooses the macroblock mode, and passes control to a function block 750. The function block 750 encodes the current macroblock, and passes control to a decision block 755. The decision block 455 determines whether or not all macroblocks have been encoded. If so, then control is passed to a function block 760. Otherwise, control is returned to the function block 740.

The function block 760 increments the variable j, and passes control to a function block 762. The function block 762 performs deblocking filtering the reconstructed picture, and passes control to a function block 764. The function block 764 stores the reconstructed picture in the decoded picture buffer (DPB), and passes control to the function block 765. The function block 765 increments frame_num and Picture Order Count (POC) values, and returns control to the decision block 735.

The decision block 770 determines whether or not to signal the Sequence Parameter Set (SPS), the Picture Parameter Set (PPS), and/or the View Parameter Set (VPS) in-band. If so, the control is passed to a function block 775. Otherwise, control is passed to a function block 780.

The function block 775 writes the Sequence Parameter Set (SPS), the Picture Parameter Set (PPS), and/or the View Parameter Set (VPS) to a file (in-band), and passes control to a function block 785.

The function block 780 writes the Sequence Parameter Set (SPS), the Picture Parameter Set (PPS), and/or the View Parameter Set (VPS) out-of-band, and passes control to the function block 785.

The function block 785 writes the bitstream to a file or streams the bitstream over a network, and passes control to an end block 799.

The function block 790 increments the variable i, resets the frame_num and Picture Order Count (POC) values, and returns control to the decision block 730.

Figure 8:
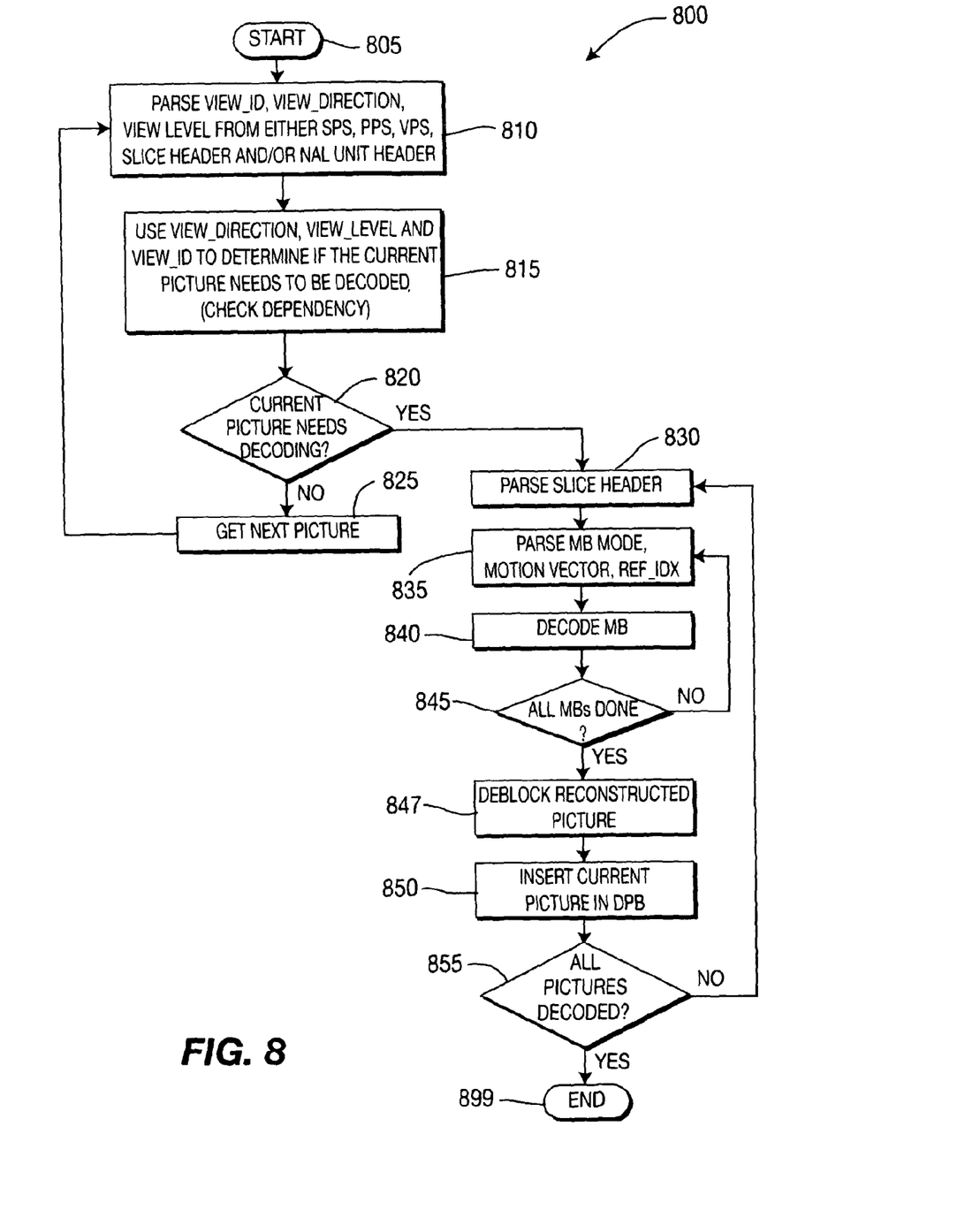
FIG. 8 is a flow diagram for an exemplary method for decoding multi-view video content, in accordance with an embodiment of the present principles.

Turning to FIG. 8, an exemplary method for decoding multi-view video content is indicated generally by the reference numeral 800.

The method 800 includes a start block 805 that passes control to a function block 810. The function block 810 parses the view_id, view_direction, and view_level from the Sequence Parameter Set (SPS), the Picture Parameter Set, the View Parameter Set, the slice header, and/or the NAL unit header, and passes control to a function block 815. The function block 815 uses view_direction, view_level, and view_id to determine if the current picture needs to be decoded (check dependency), and passes control to a decision block 820. The decision block 820 determines whether or not the current picture needs decoding. If so, then control is passed to a function block 830. Otherwise, control is passed to a function block 825.

The function block 825 gets the next picture, and returns control to the function block 810.

The function block 830 parses the slice header, and passes control to a function block 835. The function block 835 parses the macroblock mode, the motion vector, and ref_idx, and passes control to a function block 840. The function block 840 decodes the current macroblock, and passes control to a decision block 845. The decision block 845 determines whether or not all macroblocks have been decoded. If so, the control is passed to a function block 847. Otherwise, control is returned to the function block 835.

The function block 847 performs deblocking filtering on the reconstructed picture, and passes control to a function block 850. The function block 850 inserts the current picture in the decoded picture buffer, and passes control to a decision block 855. The decision block 555 determines whether or not all pictures have been decoded. If so, then control is passed to an end block 899. Otherwise, control is returned to the function block 830.

A description will now be given of some of the many attendant advantages/features of the present invention, some of which have been mentioned above. For example, one advantage/feature is an apparatus that includes an encoder for encoding at least one block in at least one picture for at least one view of multi-view video content. The encoder has a deblocking filter for performing adaptive deblocking filtering on the at least one block responsive to an indication of at least one of illumination compensation and color compensation being used for the at least one block.

Another advantage/feature is the apparatus having the encoder that has the deblocking filter as described above, wherein a filter strength of the deblocking filter is adapted responsive to the indication of at least one of the illumination compensation and the color compensation being used for the at least one block.

Yet another advantage/feature is the apparatus having the encoder that has the deblocking filter wherein a filter strength of the deblocking filter is adapted responsive to the indication of at least one of the illumination compensation and the color compensation being used for the at least one block as described above, wherein the filter strength is changed when at least one of two neighboring blocks use at least one of the illumination compensation and the color compensation, the two neighboring blocks being in a particular one of the at least one picture or in respective adjacent pictures of the at least one picture.

Still another advantage/feature is the apparatus having the encoder that has the deblocking filter wherein a filter strength of the deblocking filter is adapted responsive to the indication of at least one of the illumination compensation and the color compensation being used for the at least one block as described above, wherein the filter strength is incremented by one after the filter strength is determine by a method corresponding to the International Organization for Standardization/International Electrotechnical Commission Moving Picture Experts Group-4 Part 10 Advanced Video Coding standard/International Telecommunication Union, Telecommunication Sector H.264 recommendation.

Moreover, another advantage/feature is the apparatus having the encoder that has the deblocking filter wherein a filter strength of the deblocking filter is adapted responsive to the indication of at least one of the illumination compensation and the color compensation being used for the at least one block as described above, wherein the encoder encodes the at least one picture by modifying an alpha table index value when two neighboring blocks have different multi-view video coding prediction types, the two neighboring blocks being in a particular one of the at least one picture or in respective adjacent pictures of the at least one picture.

Further, another advantage/feature is the apparatus having the encoder that has the deblocking filter as described above, wherein a length of the deblocking filter is adapted responsive to the indication of at least one of the illumination compensation and the color compensation being used for the at least one block.

Also, another advantage/feature is the apparatus having the encoder that has the deblocking filter as described above, wherein a type of the deblocking filter is adapted responsive to the indication of at least one of the illumination compensation and the color compensation being used for the at least one block.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding at least one block in at least one picture for at least one view of multi-view video content, the encoder having a deblocking filter for performing adaptive deblocking filtering on the at least one block responsive to an indication of at least one of illumination compensation and color compensation being used for the at least one block, wherein said encoder encodes the at least one picture by modifying an alpha table index value when two neighboring blocks have different multi-view video coding prediction types, the two neighboring blocks being in a particular one of the at least one picture or in respective adjacent pictures of the at least one picture.

2. The apparatus of claim 1, wherein a filter strength of the deblocking filter is adapted responsive to the indication of at least one of the illumination compensation and the color compensation being used for the at least one block.

3. The apparatus of claim 2, wherein the filter strength is changed when at least one of two neighboring blocks use at least one of the illumination compensation and the color compensation, the two neighboring blocks being in a particular one of the at least one picture or in respective adjacent pictures of the at least one picture.

4. The apparatus of claim 2, wherein the filter strength is incremented by one after the filter strength is determine by a method corresponding to the International Organization for Standardization/International Electrotechnical Commission Moving Picture Experts Group-4 Part 10 Advanced Video Coding standard/International Telecommunication Union, Telecommunication Sector H.264 recommendation.

5. The apparatus of claim 1, wherein a length of the deblocking filter is adapted responsive to the indication of at least one of the illumination compensation and the color compensation being used for the at least one block.

6. The apparatus of claim 1, wherein a type of the deblocking filter is adapted responsive to the indication of at least one of the illumination compensation and the color compensation being used for the at least one block.

7. A method, comprising:
encoding at least one block in at least one picture for at least one view of multi-view video content, wherein said encoding step comprises performing adaptive deblocking filtering on the at least one block responsive to an indication of at least one of illumination compensation and color compensation being used for the at least one block, wherein said encoding step encodes the at least one picture by modifying an alpha table index value when two neighboring blocks have different multi-view video coding prediction types, the two neighboring blocks being in a particular one of the at least one picture or in respective adjacent pictures of the at least one picture.

8. The method of claim 7, wherein a filter strength of a deblocking filtering used to perform the adaptive deblocking filtering is adapted responsive to the indication of at least one of the illumination compensation and the color compensation being used for the at least one block.

9. The method of claim 8, wherein the filter strength is changed when at least one of two neighboring blocks use at least one of the illumination compensation and the color compensation, the two neighboring blocks being in a particular one of the at least one picture or in respective adjacent pictures of the at least one picture.

10. The method of claim 8, wherein the filter strength is incremented by one after the filter strength is determine by a method corresponding to the International Organization for Standardization/International Electrotechnical Commission Moving Picture Experts Group-4 Part 10 Advanced Video Coding standard/International Telecommunication Union, Telecommunication Sector H.264 recommendation.

11. The method of claim 7, wherein a length of a deblocking filter used to perform the adaptive deblocking filtering is adapted responsive to the indication of at least one of the illumination compensation and the color compensation being used for the at least one block.

12. The method of claim 7, wherein a type of a deblocking filter used to perform the adaptive deblocking filtering is adapted responsive to the indication of at least one of the illumination compensation and the color compensation being used for the at least one block.

13. An apparatus, comprising:
a decoder for decoding at least one block in at least one picture for at least one view of multi-view video content, the decoder having a deblocking filter for performing adaptive deblocking filtering on the at least one block responsive to an indication of at least one of illumination compensation and color compensation being used for the at least one block, wherein said decoder decodes the at least one picture by modifying an alpha table index value when two neighboring blocks have different multi-view video coding prediction types, the two neighboring blocks being in a particular one of the at least one picture or in respective adjacent pictures of the at least one picture.

14. The apparatus of claim 13, wherein a filter strength of a deblocking filter used to perform the adaptive deblocking filtering is adapted responsive to the indication of at least one of the illumination compensation and the color compensation being used for the at least one block.

15. The apparatus of claim 14, wherein the filter strength is changed when at least one of two neighboring blocks use at least one of the illumination compensation and the color compensation, the two neighboring blocks being in a particular one of the at least one picture or in respective adjacent pictures of the at least one picture.

16. The apparatus of claim 14, wherein the filter strength is incremented by one after the filter strength is determine by a method corresponding to the International Organization for Standardization/International Electrotechnical Commission Moving Picture Experts Group-4 Part 10 Advanced Video Coding standard/International Telecommunication Union, Telecommunication Sector H.264 recommendation.

17. The apparatus of claim 13, wherein a length of the deblocking filter is adapted responsive to the indication of at least one of the illumination compensation and the color compensation being used for the at least one block.

18. The apparatus of claim 13, wherein a type of the deblocking filter is adapted responsive to the indication of at least one of the illumination compensation and the color compensation being used for the at least one block.

19. A method, comprising:
decoding at least one block in at least one picture for at least one view of multi-view video content, wherein said decoding step comprises performing adaptive deblocking filtering on the at least one block responsive to an indication of at least one of illumination compensation and color compensation being used for the at least one block, wherein said decoding step decodes the at least one picture by modifying an alpha table index value when two neighboring blocks have different multi-view video coding prediction types, the two neighboring blocks being in a particular one of the at least one picture or in respective adjacent pictures of the at least one picture.

20. The method of claim 19, wherein a filter strength of a deblocking filter used to perform the adaptive deblocking filtering is adapted responsive to the indication of at least one of the illumination compensation and the color compensation being used for the at least one block.

21. The method of claim 20, wherein the filter strength is changed when at least one of two neighboring blocks use at least one of illumination compensation and color compensation, the two neighboring blocks being in a particular one of the at least one picture or in respective adjacent pictures of the at least one picture.

22. The method of claim 20, wherein the filter strength is incremented by one after the filter strength is determine by a method corresponding to the International Organization for Standardization/International Electrotechnical Commission Moving Picture Experts Group-4 Part 10 Advanced Video Coding standard/International Telecommunication Union, Telecommunication Sector H.264 recommendation.

23. The method of claim 19, wherein a length of a deblocking filter used to perform the adaptive deblocking filtering is adapted responsive to the indication of at least one of the illumination compensation and the color compensation being used for the at least one block.

24. The method of claim 19, wherein a type of a deblocking filter used to perform the adaptive deblocking filtering is adapted responsive to the indication of at least one of the illumination compensation and the color compensation being used for the at least one block.

25. A non-transitory storage media having computer-executable code stored thereon for performing a method, the method comprising:
   encoding at least one block in at least one picture for at least one view of multi-view video content by performing adaptive deblocking filtering responsive to an indication of at least one of illumination compensation and color compensation being used for the at least one block,
   wherein said encoding step encodes the at least one picture by modifying an alpha table index value when two neighboring blocks have different multi-view video coding prediction types, the two neighboring blocks being in a particular one of the at least one picture or in respective adjacent pictures of the at least one picture.

* * * * *